US006936943B2

(12) United States Patent
Wasson

(10) Patent No.: US 6,936,943 B2
(45) Date of Patent: Aug. 30, 2005

(54) MEMBER FOR REDUCING LEAKAGE CURRENT THROUGH A BEARING OF AN ELECTRIC MOTOR

(75) Inventor: Dewain L. Wasson, Hudson, WI (US)

(73) Assignee: McMillan Electric Company, Woodville, WI (US)

( * ) Notice: Subject to any disclaimer, the term of this patent is extended or adjusted under 35 U.S.C. 154(b) by 0 days.

(21) Appl. No.: 10/682,373

(22) Filed: Oct. 8, 2003

(65) Prior Publication Data

US 2005/0077791 A1 Apr. 14, 2005

(51) Int. Cl.[7] .......................... H02K 5/04; H02K 5/16
(52) U.S. Cl. .......................... 310/89; 310/90
(58) Field of Search .......................... 310/51, 67 R, 310/254, 258, 259, 216, 89, 90; 384/277, 476

(56) References Cited

U.S. PATENT DOCUMENTS

| | | | | |
|---|---|---|---|---|
| 1,991,622 A | * | 2/1935 | Okenfuss | 384/438 |
| 3,482,125 A | * | 12/1969 | Fleckenstein | 310/42 |
| 3,555,320 A | * | 1/1971 | Johnson | 310/89 |
| 3,760,209 A | * | 9/1973 | Hult | 310/91 |
| RE35,855 E | | 7/1998 | Blaettner et al. | 310/90 |
| 5,914,547 A | | 6/1999 | Barahia et al. | 310/71 |
| 5,969,447 A | | 10/1999 | Periyathamby et al. | 310/89 |
| 6,091,173 A | | 7/2000 | Byrd | 310/85 |
| 2002/0121821 A1 | | 9/2002 | Ritter | 310/71 |

FOREIGN PATENT DOCUMENTS

| | | | | |
|---|---|---|---|---|
| DE | 4035695 | * | 5/1992 | H02K/5/16 |
| EP | 0788213 | * | 8/1997 | H02K/5/124 |
| GB | 2 231 447 A | | 11/1990 | H02K/5/16 |
| JP | 53-164607 | | 12/1978 | H02K/5/16 |
| JP | 55-139049 | | 10/1980 | H02K/5/16 |
| JP | 57-183052 | | 11/1982 | H02K/5/123 |
| JP | 62-14965 | | 1/1987 | H02K/11/00 |
| JP | 63-161835 | | 7/1988 | H02K/5/16 |
| JP | 01-231633 | | 9/1989 | H02K/5/16 |
| JP | 02-55546 | | 2/1990 | H02K/5/16 |
| JP | 04-117148 | | 4/1992 | H02K/5/16 |
| JP | 04-156246 | | 5/1992 | H02K/5/16 |

* cited by examiner

*Primary Examiner*—Burton Mullins
(74) *Attorney, Agent, or Firm*—Merchant & Gould P.C.

(57) ABSTRACT

An electric motor including a sleeve with an open end, a shoulder of the sleeve positioned adjacent to the open end, and a frontplate covering the open end of the sleeve. The motor also includes a member positioned between the sleeve and the frontplate, the member being a solid, unitary piece of non-conductive material. The member can include a first portion positioned between the sleeve and the frontplate, a second portion extending to the shoulder of the sleeve, and a third portion positioned adjacent to the shoulder of the sleeve. The motor can also include another member positioned between the sleeve and a backplate of the motor, the member including a tab received in a notch formed in an opposite periphery of the sleeve to rotationally orient the backplate with respect to the sleeve. The members can reduce a leakage current through a bearing of the motor.

16 Claims, 13 Drawing Sheets

MEMBER FOR REDUCING LEAKAGE CURRENT THROUGH A BEARING OF AN ELECTRIC MOTOR

TECHNICAL FIELD

This invention relates generally to electric motors. More particularly, this invention relates to systems and methods for reducing leakage current through a bearing of an electric motor.

BACKGROUND

In the electric motor industry, it has become increasingly popular to use components including high frequency power converters (e.g., pulse width modulators) to control electric motors, such as motor speed, torque, velocity, acceleration, etc. However, an unintended consequence of the use of components such as high frequency power converters is the creation of capacitive-coupled electric currents, sometimes referred to as leakage current. This leakage current can conduct through the primary insulation of an electric motor, through the motor components including the ball bearings, and into the electrical ground of the motor. The leakage current can eventually cause the raceways and roller balls of the bearings to mechanically break down and fail in a premature manner.

Various structures for reducing leakage current through electric motors are known. These structures are provided in an attempt to reduce leakage current flowing through the internal components of the electric motor, such as the bearings. For example, Japanese Reference Nos. 63-161835, 2055546, 01-231633, and 4-117148 all disclose structures provided in attempts to reduce leakage current through internal components of electric motors. However, the structures disclosed in these references are complex in design and can be difficult to incorporate into the manufacturing process of the electric motors.

For example, structures are disclosed in Japanese Reference No. 4-117148 for protecting a bearing from electrolytic corrosion. These structures include insulators with apertures to accommodate fasteners extending through the insulators to couple various components of the motor together. However, structures that include apertures for fasteners can be difficult to handle during the manufacturing process of the motor since such apertures must be aligned with other apertures provided on components of the motor to affix the structures in place. In addition, undesirable conduction paths for the leakage current can be provided by the fasteners running through the structures.

Other embodiments of structures meant to reduce the conduction of leakage current are disclosed in Japanese Reference No. 4-117148 and are formed of multiple pieces which together are configured to reduce leakage current. However, structures formed of multiple pieces can also be difficult to assemble during manufacture of the motor.

Other designs have also been used in an attempt to reduce the effects of leakage current. For example, conductive grease has been used to surround the balls of a bearing of a motor to conduct leakage current around or away from the balls. In other designs, portions of bearings have been made of non-conductive ceramic material, or additional brushes have been configured to contact the shaft of the motor and thereby shunt leakage current around the bearings. In yet other designs, plastic "cups" have been used to surround the bearing in an attempt to increase the impedance for leakage current traveling to the bearings. However, these designs can be undesirable in that they can be difficult to implement, require multiple components made of various non-conductive material, may not provide adequate protection against leakage current, and can have other undesirable consequences such as increasing the working temperature in the bearings.

Accordingly, while structures for reducing leakage currents through an electric motor are known, it is desirable to provide members that are simple structurally, provide adequate reduction in leakage current through internal components of electric motors, and can be easily incorporated into the manufacturing process of the electric motors.

SUMMARY

This invention relates generally to electric motors. More particularly, this invention relates to systems and methods for reducing electrical current (e.g., leakage current) through a bearing of an electric motor.

Generally, the present invention relates to members that can be used to reduce leakage current flowing through internal components of an electric motor such as the bearings. In example embodiments disclosed herein, one member can be positioned between a sleeve and frontplate of an electric motor to diminish a flow of leakage current between the sleeve and the frontplate, thereby enhancing durability of the bearings of the motor.

In other example embodiments, another member can be positioned between the sleeve and the backplate of the motor, thereby enhancing durability of the bearings of the motor. This member can also include a tab configured to be received in a notch formed in a periphery of the sleeve to rotationally orient the backplate with respect to the sleeve.

The above summary is not intended to describe each disclosed embodiment or every implementation of the present invention. Figures and the detailed description that follow more particularly exemplify embodiments of the invention. While certain embodiments will be illustrated and described, the invention is not limited to use in such embodiments.

BRIEF DESCRIPTION OF THE DRAWINGS

Aspects of the invention may be more completely understood in consideration of the following detailed description of various embodiments of the invention in connection with the accompanying drawings, in which.

While the invention is amenable to various modifications and alternative forms, specifics thereof have been shown by way of example and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

This invention relates generally to electric motors. More particularly, this invention relates to systems and methods for reducing electric current (e.g., leakage current) through a bearing of an electric motor. While the present invention is not so limited, an appreciation of the various aspects of the invention will be gained through a discussion of the examples provided below.

As used herein, the phrase "leakage current" means undesirable electric current generated in association with an electric motor. Leakage current may include, for example and without limitation, capacitively coupled current, eddy current, and electrostatic current generated by components of an electric motor.

Generally, the present invention relates to members that can be used to reduce leakage current through components of an electric motor, such as a bearing. In embodiments disclosed herein, one member can be positioned between a sleeve and frontplate of an electric motor to diminish a flow of electrical current (e.g. leakage current) between the sleeve and the frontplate, thereby enhancing durability of the bearings of the motor. Another member can be positioned between the sleeve and the backplate of the motor, thereby enhancing durability of the bearings of the motor.

I. First Member

Figure 1:
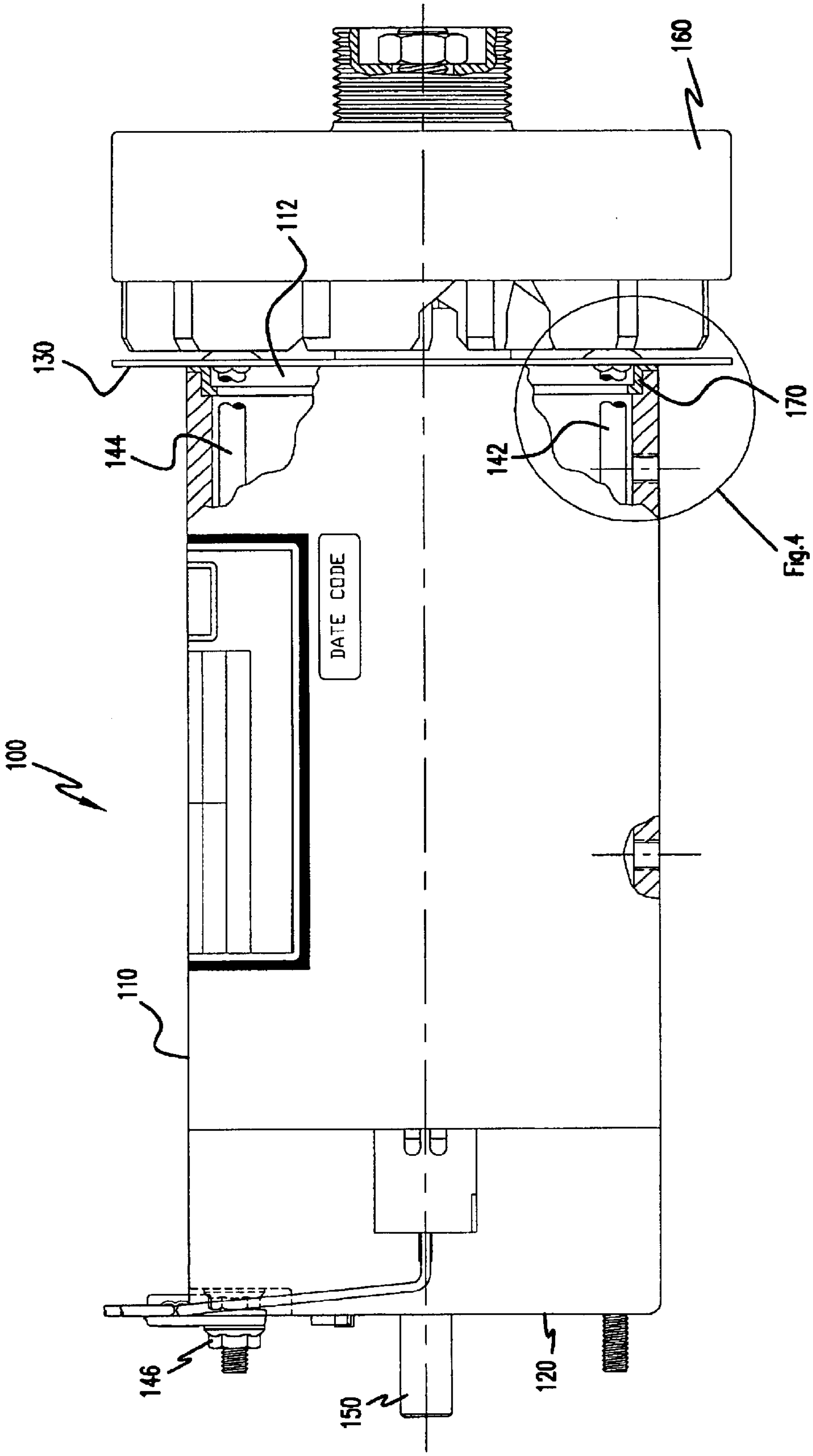
FIG. 1 is a side, partial cutaway view of an example electric motor in accordance with the present invention.
Figure 2:
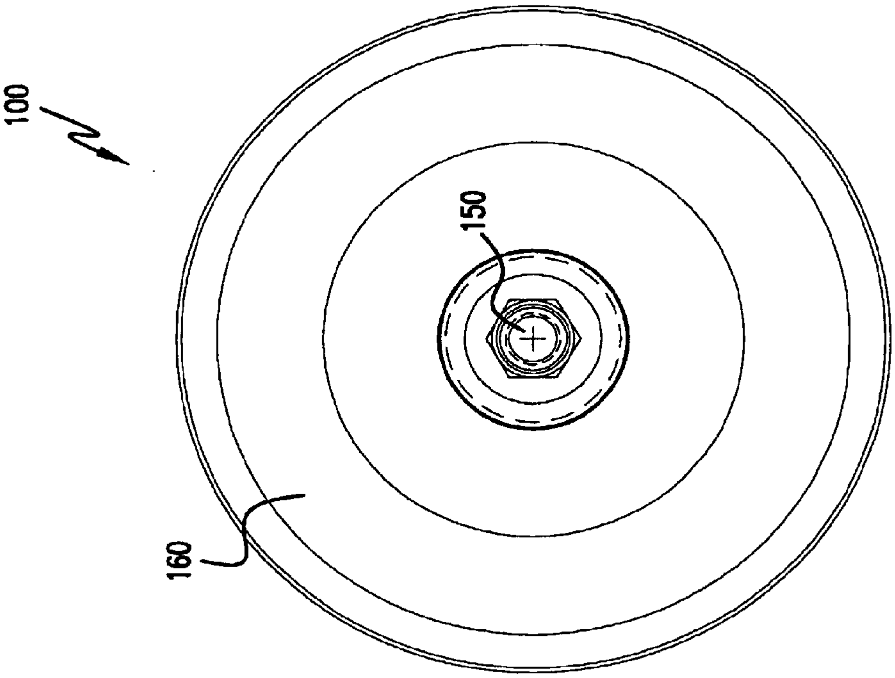
FIG. 2 is a front view of the example electric motor of FIG. 1.
Figure 3:
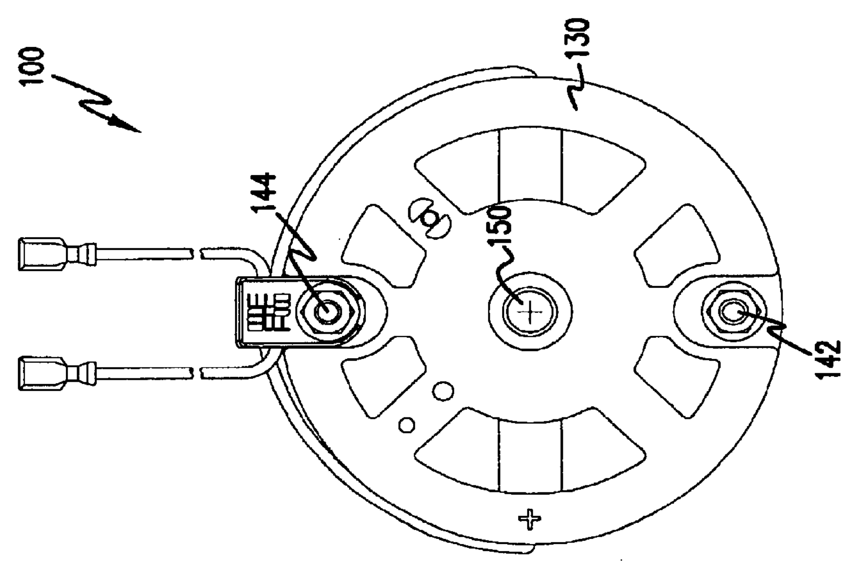
FIG. 3 is a back view of the example electric motor of FIG. 1.

Referring now to FIGS. 1–3, an example electric motor 100 is shown. The electric motor 100 generally includes a sleeve or housing 110 surrounding various components of the motor, a backplate 120, and a frontplate 130 covering an open end 112 of the sleeve 110. Fasteners 142 and 144 (bolts as illustrated in the preferred embodiment shown) extend through the frontplate 130, axially through the sleeve 110, and through the backplate 120. Nuts, such as nut 146, are used to fasten the fasteners 142 and 144 and thereby hold the frontplate 130 and backplate 120 in place on the motor 100. Other fasteners for coupling the frontplate 130 and backplate 120 to the sleeve 110 can also be used, such as for example, rivets or screws.

In preferred embodiments, the sleeve 110 is made of iron or steel, the frontplate 130 is made of stamped steel or die casted aluminum, and the backplate 120 is made of a non-conductive material.

The motor 100 also includes a shaft 150 extending axially through the motor and frontplate 130. In one embodiment, a fan-flywheel-pulley assembly 160 is coupled to an end of the shaft 150 to cool the motor, provide inertia, and transfer power from the motor to a component external to the motor.

As shown generally in FIG. 1 and more particularly in FIGS. 4–7, an example member 170 is positioned between the sleeve 110 and frontplate 130 of the motor 100. The member 170 is preferably formed as a solid, unitary piece of non-conductive material.

The term "solid" is used herein to mean that the member 170 preferably does not include any holes formed between outer and inner peripheries 472 and 474 of the member 170 for fasteners such as fasteners 142 and 144 to extend therethrough. However, it is contemplated that notches, as described further below, can be formed in the member 170 with the member still being considered solid. Further, alternative embodiments of the present invention may not be solid and may include holes through which fasteners can be run. For example, alternative embodiments may define holes through which fasteners can be run to hold the member in place and to couple the frontplate to the motor.

The term "unitary" is used to mean that the member 170 is preferably formed of a single piece of non-conductive material, rather than being formed of multiple pieces that may or may not be coupled together.

As described further below, the example member 170 includes a first portion 482 and a second portion 484 extending axially from the first portion 482 to a third portion 486 of the member.

In the preferred embodiment shown, the member 170 is made of a polymeric material such as nylon. However, other non-conductive materials can also be used, such as any non-conductive material or a conductive material that is coated with a non-conductive surface.

Figure 4:
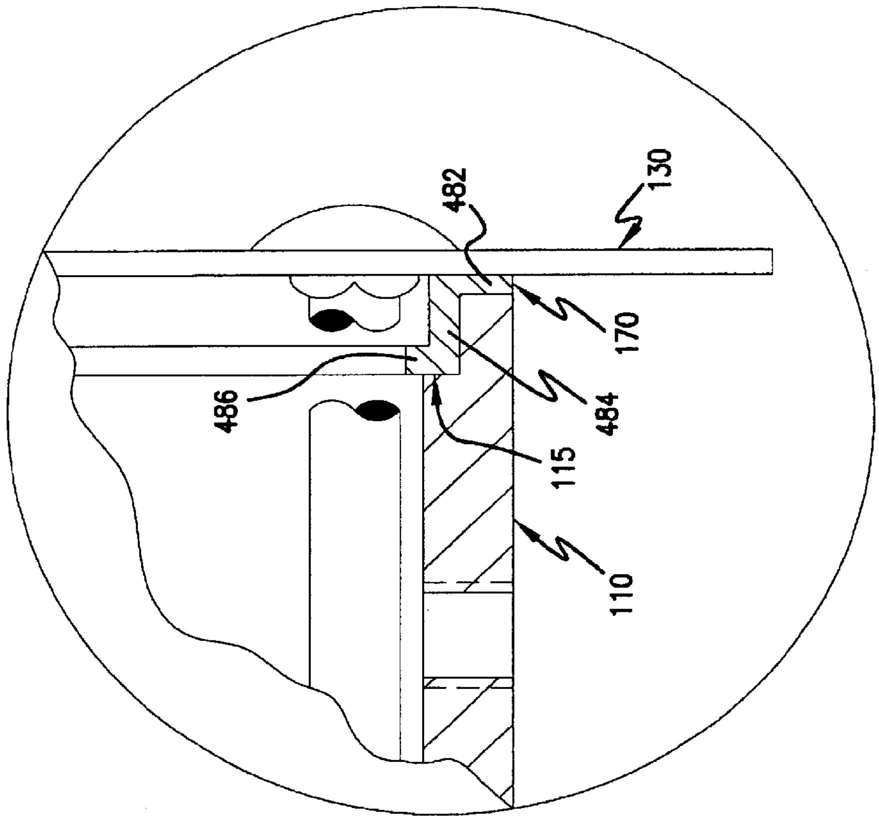
FIG. 4 is an enlarged view of a portion the example electric motor of FIG. 1.
Figure 5:
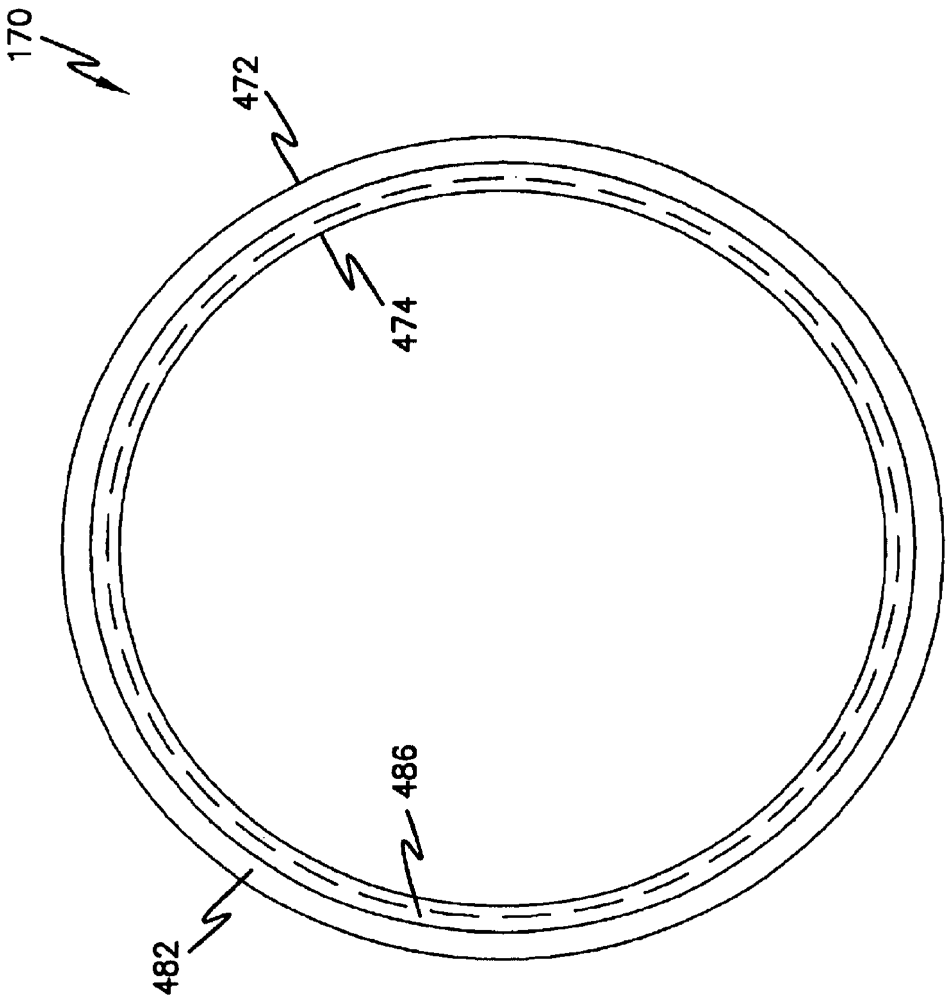
FIG. 5 is a front view of an example member made in accordance with the present invention.
Figure 6:
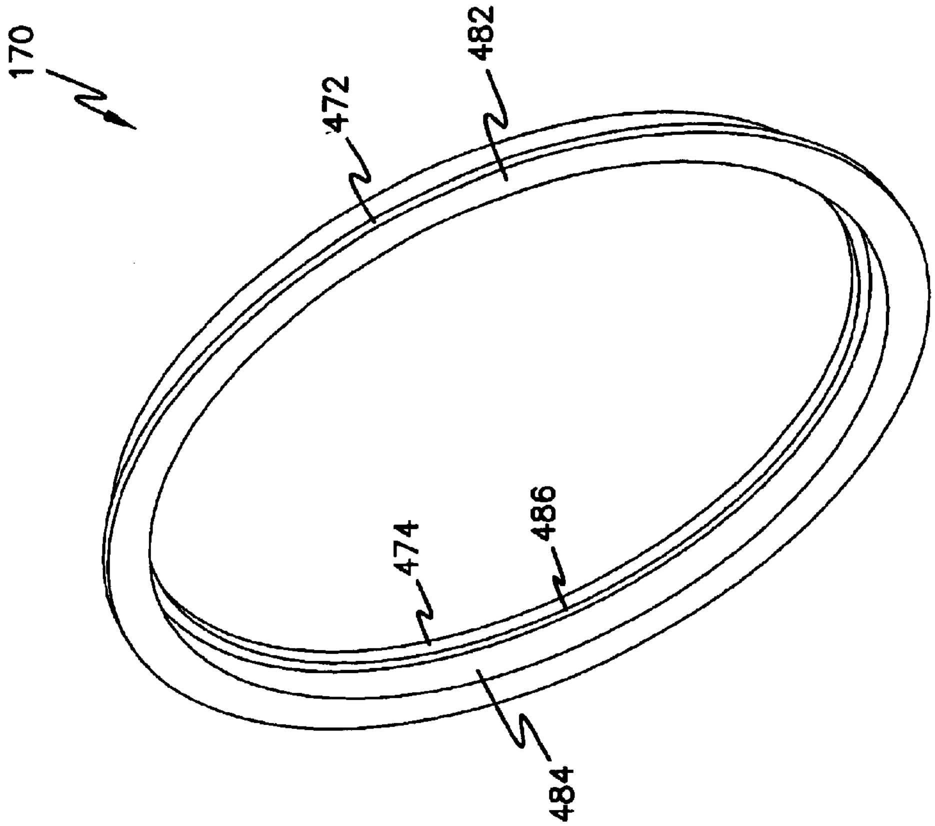
FIG. 6 is a front perspective view of the example member of FIG. 5.
Figure 7:
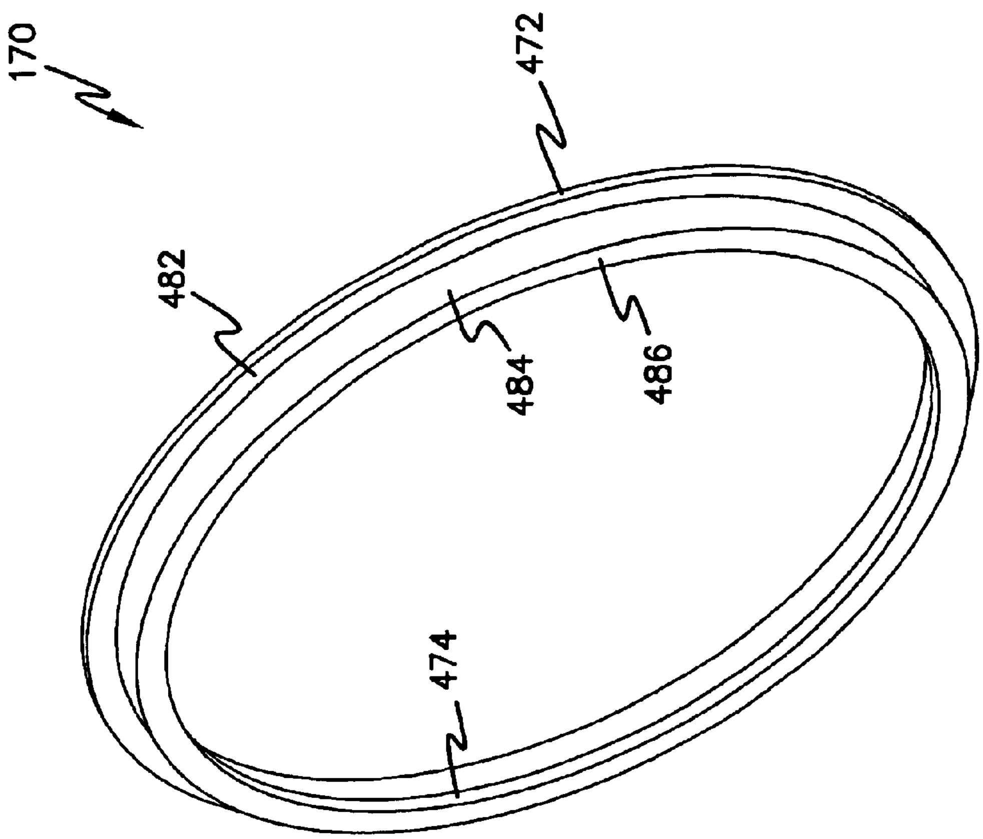
FIG. 7 is a back perspective view of the example member of FIG. 5.

As illustrated in FIGS. 1 and 4 and noted above, the first portion 482 of the member 170 is positioned between the sleeve 110 and frontplate 130 of the motor 100. In a preferred embodiment, the first portion 482 generally follows the periphery of the open end 112 of the sleeve 110. The second portion 484 of the member 170 extends axially along the sleeve 110. The third portion 486 is preferably received in a shoulder 115 formed by the sleeve 110. Preferably, the first and third portions 482 and 486 radially isolate the motor 100, while the second portion 484 axially isolates the motor.

One way the example motor 100 can be assembled is as follows. Initially, the member 170 is placed on the front plate 130 and fasteners 142 and 144 are run through the frontplate 130. Next, the sleeve 110 is coupled to the frontplate 130 so that the member 130 is positioned between the sleeve 110 and the frontplate 130. The various components of the electric motor 100 (e.g., the rotor, stator, bearings, and shaft) are then placed within the sleeve 110. Finally, the backplate 120 is coupled to the sleeve 110 and locked in place with nuts 146.

In this position between the sleeve and frontplate of the motor, the member can enhance the durability of various internal components of the motor, such as the bearings of the motor. For example, the member can function to diminish the flow of leakage current between the sleeve and the frontplate, thereby enhancing durability of the bearings of the motor.

Figure 14:
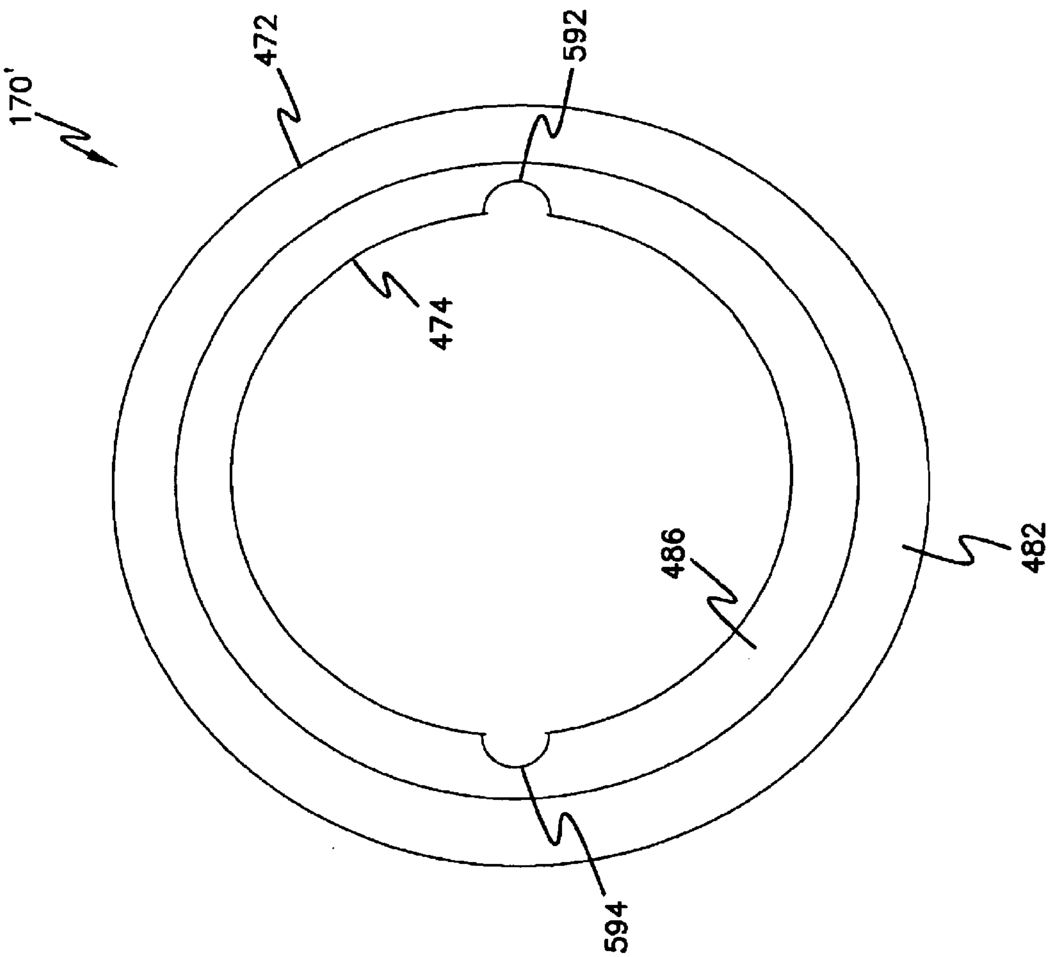
FIG. 14 is a front view of another example member made in accordance with the present invention.

In an alternative embodiment of the member 170' shown in FIG. 14, notches 592 and 594 are formed in the inner periphery 474 of the member 170. The notches 592 and 594 are formed, for example, when the inner periphery 474 is extended so that the notches 592 and 594 accept a section of each fastener 142 and 144, respectively, as the fasteners extend axially through the sleeve 110. In a further alternative embodiment, holes can be defined through the member 170 so that the fasteners run through the member between the inner and outer peripheries 472 and 474. In other embodiments, the fasteners can be positioned outside the sleeve to extend from the frontplate to the backplate.

II. Second Member

Figure 8:
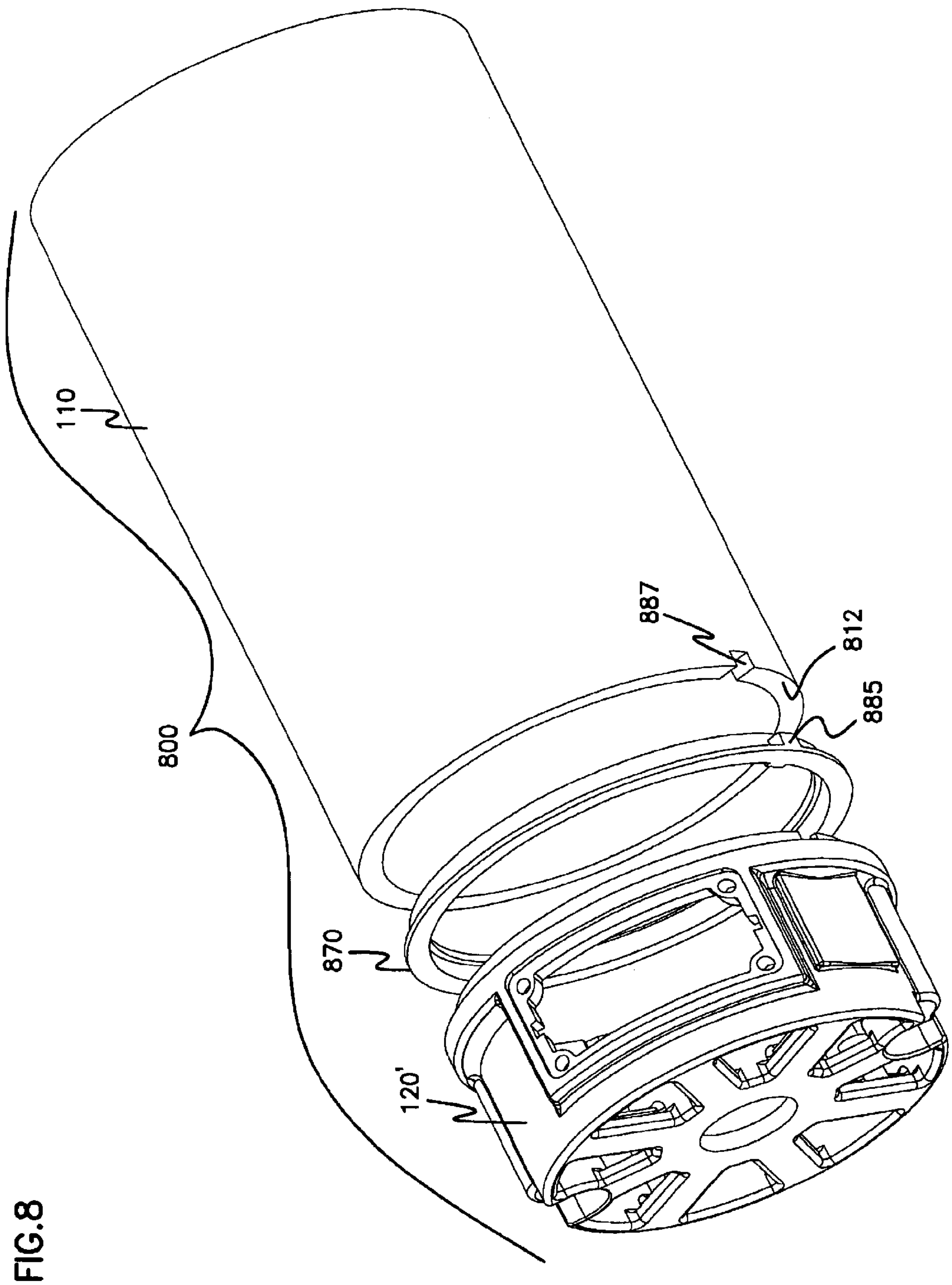
FIG. 8 is an exploded perspective view of another example electric motor made in accordance with the present invention.
Figure 9:
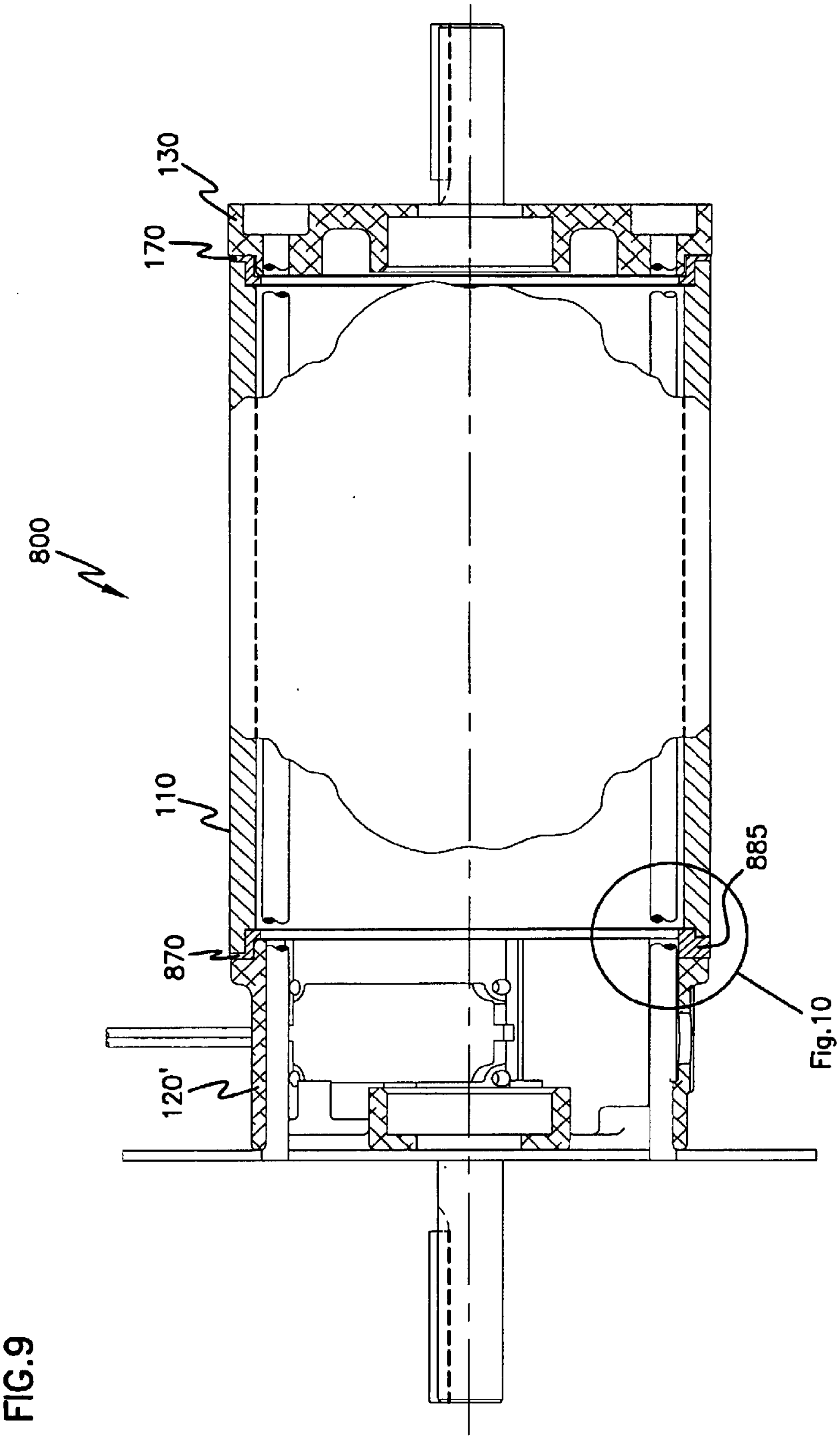
FIG. 9 is a side, partial cutaway view of the example electric motor of FIG. 8.
Figure 10:
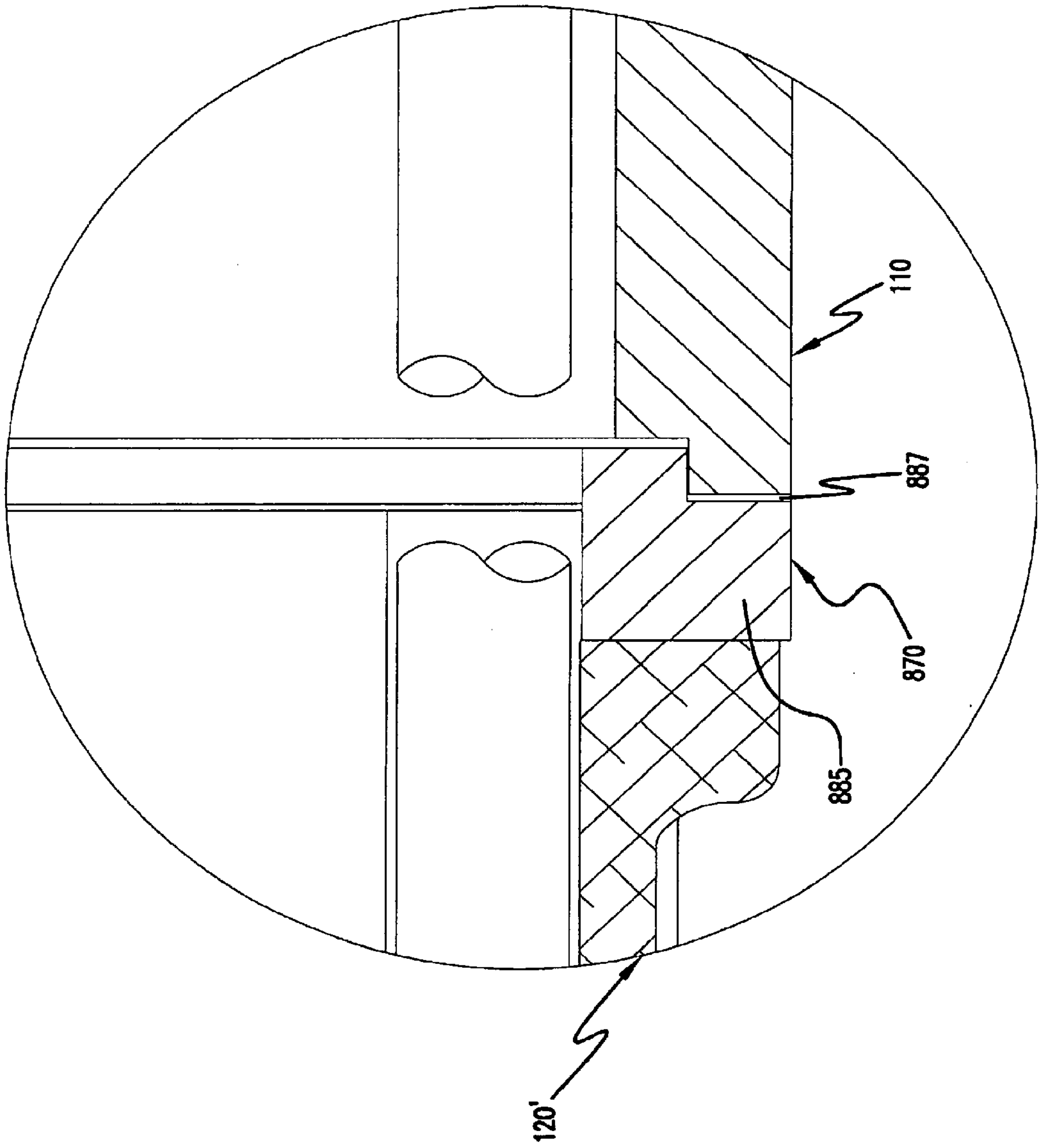
FIG. 10 is an enlarged view of a portion of the example electric motor of FIG. 8.

Referring now to FIGS. 8–10, another example electric motor 800 is illustrated. The motor 800 is similar to example motor 100 described above, except that motor 800 not only includes member 170 positioned between the sleeve 110 and the frontplate 160, but also includes another example member 870 positioned between the sleeve 110 and a backplate 120' preferably made of a conductive material such as, for example, stamped steel or die casted aluminum.

Figure 11:
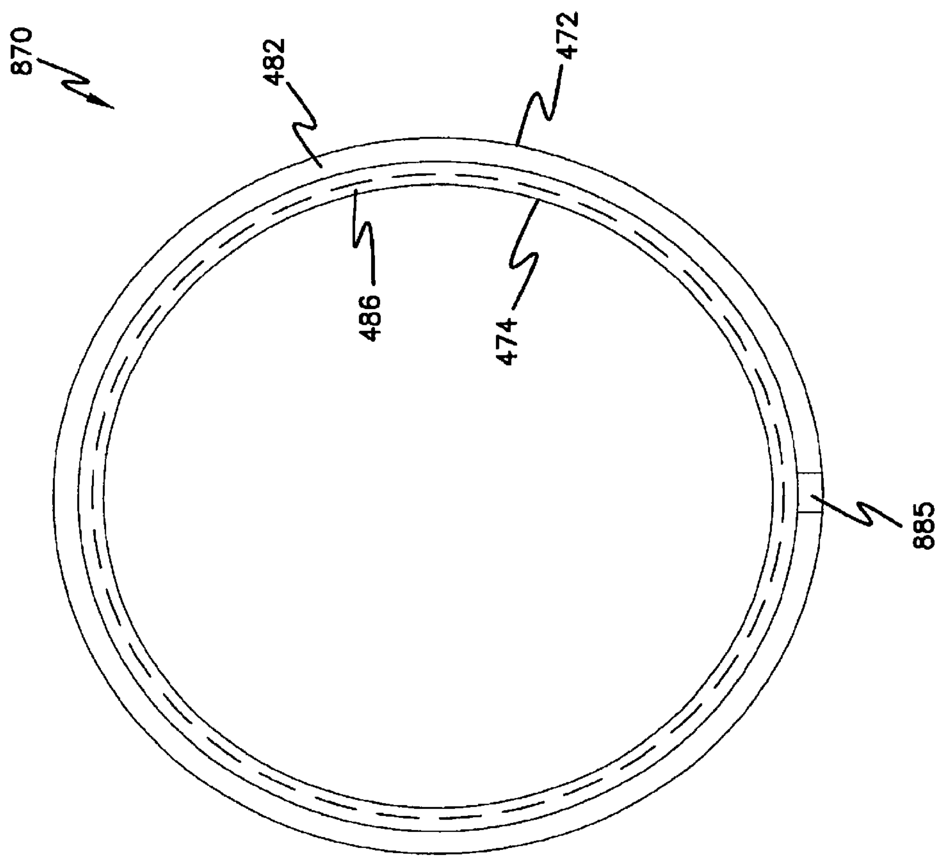
FIG. 11 is a front view of another example member made in accordance with the present invention.
Figure 12:
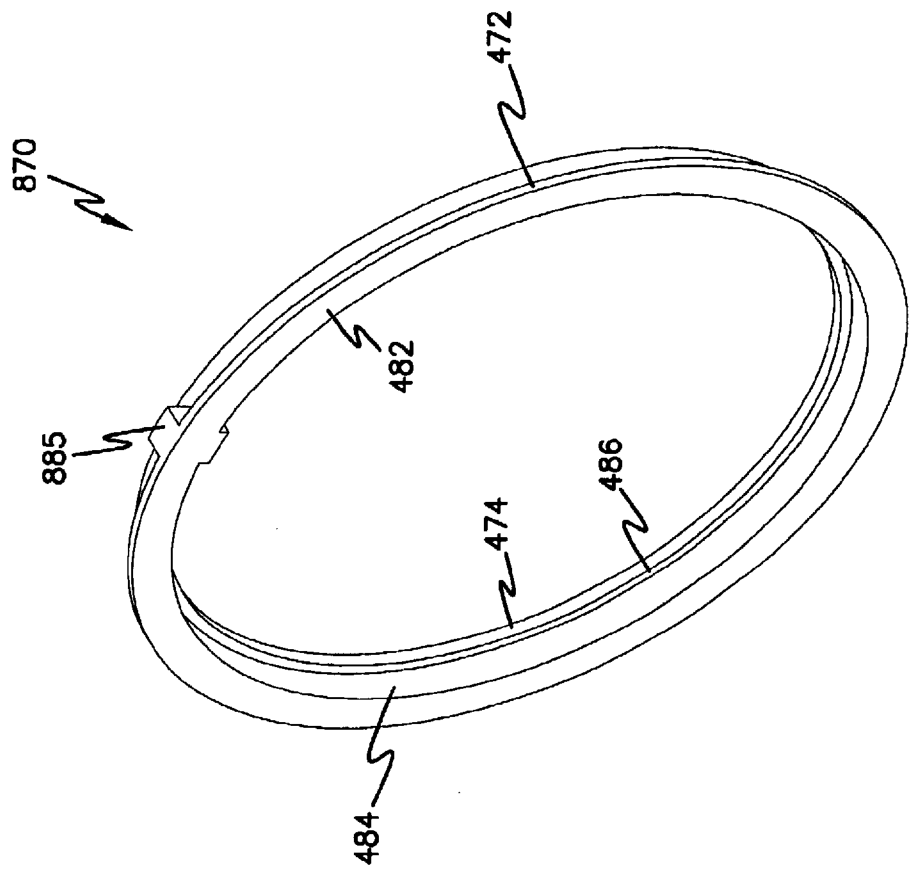
FIG. 12 is a front perspective view of the example member of FIG. 11.
Figure 13:
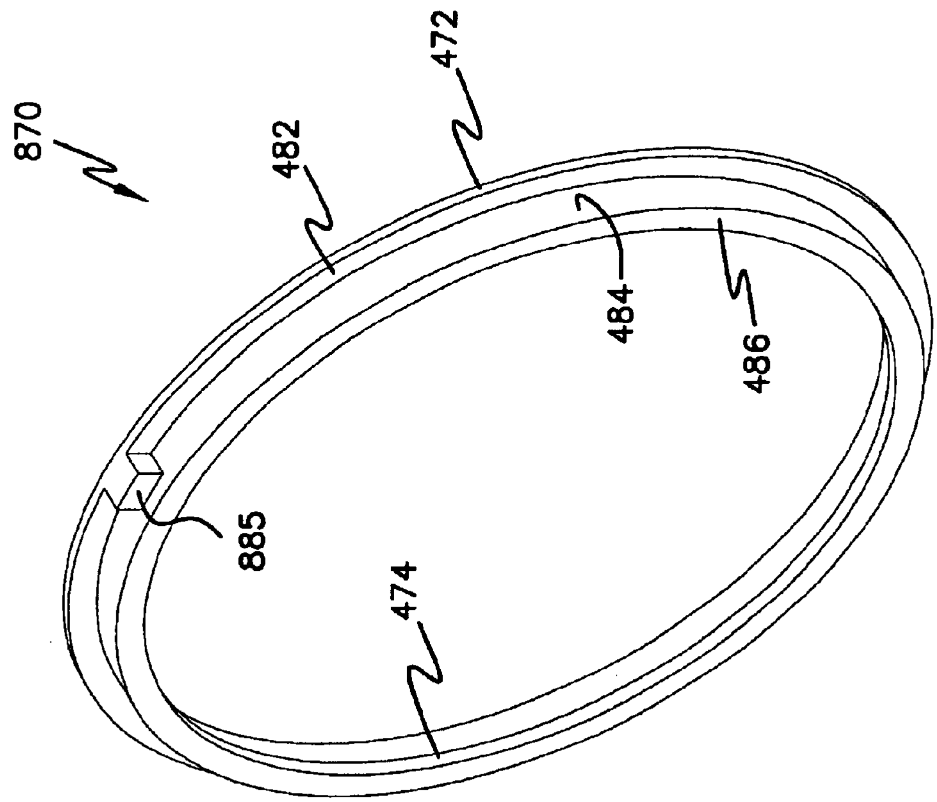
FIG. 13 is a back perspective view of the example member of FIG. 11.

The member 870, shown more particularly in FIGS. 11–13, is configured similarly to member 170, in that member 870 preferably includes first portion 482 and second portion 484 extending axially from the first portion 482 to third portion 486. The member 870 differs in that it includes a tab 885 formed in member 870. In addition, a notch 887 is formed in a periphery 812 of the sleeve 110 to receive the tab 885.

In this manner, the member 870 not only functions to reduce leakage current through the backplate 120' and bearings of the motor 800, but also functions as a "key" in that once the member is placed on the backplate 120' in a desired rotational orientation, the member can be used to rotationally orient the backplate 120' with respect to the sleeve 110. For example, the tab 885 assures that the member 870 and associated backplate 120' are placed on the sleeve 110 at a given rotational orientation as the tab 885 is received in the notch 887. This can be advantageous, for example, so that brushes carried in the backplate 130 are correctly oriented with respect to the components held within the sleeve 110 of the motor 800.

It should be understood that either of the members 170 and 870 can be used separately or in conjunction with one another to reduce leakage current through the bearings.

It can be advantageous to form the members as illustrated herein for several reasons. For example, because one preferred embodiment of the members is solid, there is no need to feed fasteners through the members, and leakage current is therefore not conducted by the fasteners through the members. Further, because each of the members is preferably formed as a unitary piece, it is unnecessary to position separate pieces of the member on the sleeve and/or frontplate of the motor. In addition, because of the shape of the first member and complementary shape of the sleeve (e.g., the outer periphery of the sleeve and possibly the shoulder if included), the members can preferably be positioned on the sleeve without requiring additional structure to hold the member in place on the sleeve during assembly of the motor.

Further, the member can compensate for small deviations in the size and/or shape of the frontplate and backplate with respect to the sleeve to allow the frontplate and backplate to be more easily coupled to the sleeve. In alternative embodiments, crush ribs, in varying number and size, can be provided on the member to further compensate for variances in the tolerances of the frontplate, backplate, and sleeve.

In addition, the second member can function to rotationally orient the backplate with respect to the sleeve so that, for example, brushes carried in the backplate are correctly oriented with respect to the components held within the sleeve of the motor.

Various modifications can be made to the motor and member shown and described herein. For example, instead of forming the member as a unitary piece, initially the portions of the member can be formed as separate pieces that are coupled together prior to insertion into the motor. In addition, modifications to the shape of the member can be made. For example, different portions of the member can be eliminated (e.g., the third portion 486), or additional portions added as needed to conform to the sleeve and frontplate of different motor designs. In other alternative embodiments, the member can be further modified to, for example, extend beyond the outer diameter of the sleeve to provide a portion of the member onto which various external components of the motor can be mounted.

In addition, the first and second members can be interchanged such as, for example, by eliminating the keyed portion of the second member and/or by forming a key on the first member to rotationally orient the frontplate with respect to the sleeve.

Further, modifications can be made to other components of the motor as well. For example, in alternative embodiments, the shoulder 115 formed in the sleeve 110 of motor 100 can be removed, and the member 170 can be received by the sleeve 110 simply through the interface of the first portion 482 with the periphery of the open end 112 of the sleeve 110. Other modifications are possible.

The above specification, examples and data provide a complete description of the manufacture and use of various aspects of the invention. Since many embodiments of the invention can be made without departing from the spirit and scope of the invention, the invention resides in the claims hereinafter appended.

What is claimed is:

1. An electric motor, comprising:

a shaft running axially through the motor;

a sleeve at least partially surrounding the shaft, the sleeve including a periphery defining an open end;

a metal frontplate covering the open end of the sleeve;

a member positioned between the sleeve and the frontplate, the member being formed of a unitary piece of non-conductive material including a first portion positioned between the sleeve and the frontplate, a second portion extending axially with respect to the sleeve, and a third portion extending radially; and a second member positioned between the sleeve and a backplate of the motor, wherein the second member defines a tab that in positioned within a notch defined by the sleeve to rotationally orient the backplate with respect to the sleeve;

wherein the member reduces a leakage current through a bearing of the motor.

2. The motor of claim 1, wherein the member is solid.

3. The motor of claim 1, wherein an inner periphery of the third portion defines at least two notches, each notch accepting a portion of one fastener as each fastener extends through the motor.

4. The motor of claim 1, further comprising a shoulder positioned adjacent to the open end of the sleeve, wherein the third portion of the member is positioned adjacent to the shoulder.

5. An electric motor, comprising:

a shalt running axially through the motor;

a sleeve at least partially surrounding the shaft, the sleeve including a periphery defining an open end;

a metal frontplate covering the open end of the sleeve, the frontplate defining at least two holes through which fasteners extend, the fasteners extending from the frontplate, through the sleeve, and through a backplate of the motor to couple the frontplate to the motor; and a member positioned between the sleeve and the frontplate, the member being formed of a solid, unitary piece of non-conductive material defining a single opening through which the shaft extends and being shaped to generally follow the periphery of the open end of the sleeve, the member including a first portion positioned between the sleeve and the frontplate, a second portion extending axially with respect to the sleeve, and a third portion extending radially;

wherein the member reduces a leakage current through a bearing of the motor.

6. The motor of claim 5, further comprising a second member positioned between the sleeve and a backplate of the motor.

7. The motor of claim 6, wherein the second member defines a tab that is positioned within a notch defined by the sleeve to rotationally orient the backplate with respect to the sleeve.

8. The motor of claim 5, further comprising a shoulder positioned adjacent to the open end of the sleeve, wherein the third portion of the member is positioned adjacent to the shoulder.

9. A member for reducing leakage current through components of an electric motor including a sleeve and a frontplate, the member being solid and unitary, the member comprising:

a first portion configured to be positioned between the sleeve and the frontplate of the motor;

a second portion configured to be extended to a shoulder of the sleeve; and a third portion configured to contact the shoulder of the sleeve, wherein an inner periphery of the third portion defines at least two notches configured to accept portions of fasteners of the motor.

10. The member of claim 9, wherein the first and third portions are configured to extend radially with respect to the motor, and the second portion is configured to extend axially with respect to the motor.

11. The member of claim 9, wherein the member is made of a non-conductive material.

12. A method of assembling a motor including a sleeve and a frontplate, the method comprising:

positioning a unitary member on a metal frontplate, wherein the member includes a first portion extending along a periphery of an open end defined by the sleeve, and a second portion extending axially with respect to the sleeve;

coupling the sleeve to the frontplate so that the first portion of the member is positioned between the frontplate and the sleeve;

providing various components of the motor in the sleeve;

coupling a backplate to the motor; and running a fastener used to couple the frontplate to the motor through a notch defined in an inner periphery of a third portion of the member, the third portion being seated in a shoulder of the sleeve.

13. An electric motor, comprising:

a shaft running axially through the motor;

a sleeve at least partially surrounding the shaft, the sleeve including a periphery defining an open end and a notch;

a metal backplate covering the open end of the sleeve; and a member positioned between the sleeve and the backplate, the member being formed of non-conductive material including a first portion positioned between the sleeve and the backplate, and a second portion extending axially to a shoulder of the sleeve, and the member also defining a tab positioned within the notch of the sleeve to rotationally orient the backplate with respect to the sleeve;

wherein the member reduces a leakage current through a bearing of the motor.

14. The motor of claim 13, wherein the member is unitary and solid.

15. The motor of claim 13, wherein the member includes a third portion extending perpendicular with respect to the second portion and radially with respect to the motor.

16. The motor of claim 13, wherein the tab extends radially.

* * * * *

UNITED STATES PATENT AND TRADEMARK OFFICE

CERTIFICATE OF CORRECTION

PATENT NO. : 6,936,943 B2 Page 1 of 1
DATED : August 30, 2005
INVENTOR(S) : Wasson It is certified that error appears in the above-identified patent and that said Letters Patent is hereby corrected as shown below:

Column 6,
Line 57, "a shalt running axially" should read -- a shaft running axially --.

Signed and Sealed this

Tenth Day of January, 2006

JON W. DUDAS
*Director of the United States Patent and Trademark Office*